United States Patent [19]
Levi

[11] 4,127,747
[45] Nov. 28, 1978

[54] VOLTAGE BOOST CIRCUIT FOR TELEPHONE SYSTEMS

[75] Inventor: Israel Levi, Ottawa, Canada

[73] Assignee: Northern Telecom Limited, Quebec, Canada

[21] Appl. No.: 836,063

[22] Filed: Sep. 23, 1977

[51] Int. Cl.² .............................................. H04Q 1/30
[52] U.S. Cl. ................................................... 179/16 F
[58] Field of Search ......................... 179/16 EA, 16 F

[56] References Cited

U.S. PATENT DOCUMENTS

| Re. 27,680 | 6/1973 | McNair, Jr. | 179/16 F |
|---|---|---|---|
| 3,757,052 | 9/1973 | Tothill | 179/16 F |
| 3,763,319 | 10/1973 | Chambers, Jr. | 179/16 F |
| 3,781,480 | 12/1973 | Roge | 179/16 F |
| 3,872,258 | 3/1975 | Chambers, Jr. | 179/16 F |
| 3,906,162 | 9/1975 | Sparrevohn | 179/16 F |
| 3,992,591 | 11/1976 | Ingle | 179/16 F |

FOREIGN PATENT DOCUMENTS 856,904  11/1970  Canada .................................. 179/16 F Primary Examiner—Kathleen H. Claffy
Assistant Examiner—Randall P. Myers
Attorney, Agent, or Firm—Robert C. Hogeboom

[57] ABSTRACT

In a voltage boost circuit, for telephone systems where reverse battery supervision is employed, optically coupled semiconductor devices are used to control both the polarity and the charge on a nonpolar capacitor. This capacitor is powered from a DC to DC converter and the capacitor serves the dual functions of a rectifier filter capacitor and a voice frequency (VF) bypass capacitor. The voltage boost circuit charges the capcitor so that it aids the central office battery, thus extending the normal operating range of the central office. Whenever the current in the loop drops below a predetermined threshold level, the voltage boost is removed by a rapid discharge of the aformentioned capacitor. When the loop is closed, the capacitor is quickly chared to the full boost voltage with a polarity so as to aid, or increase, the current in the loop.

6 Claims, 3 Drawing Figures

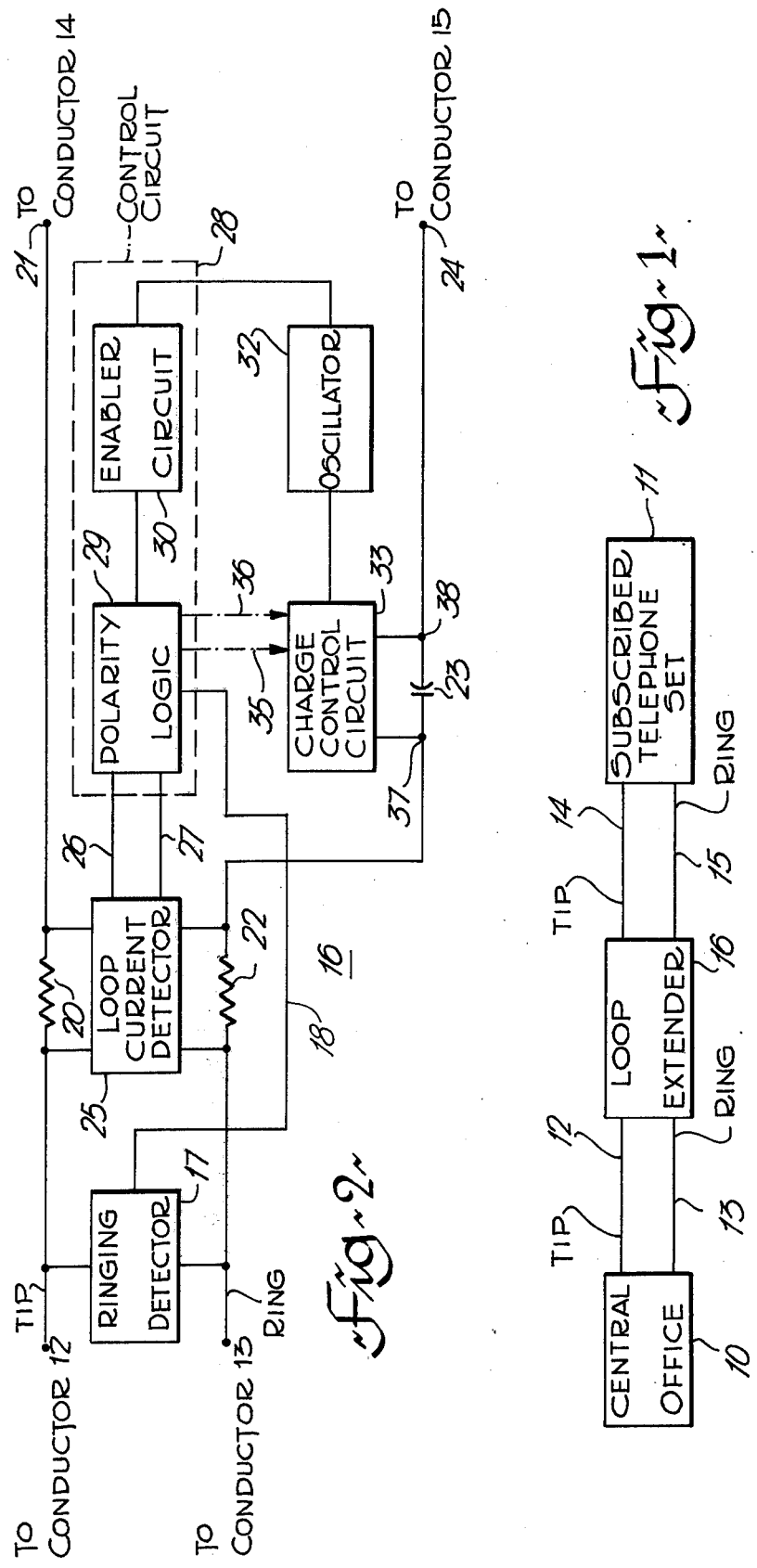

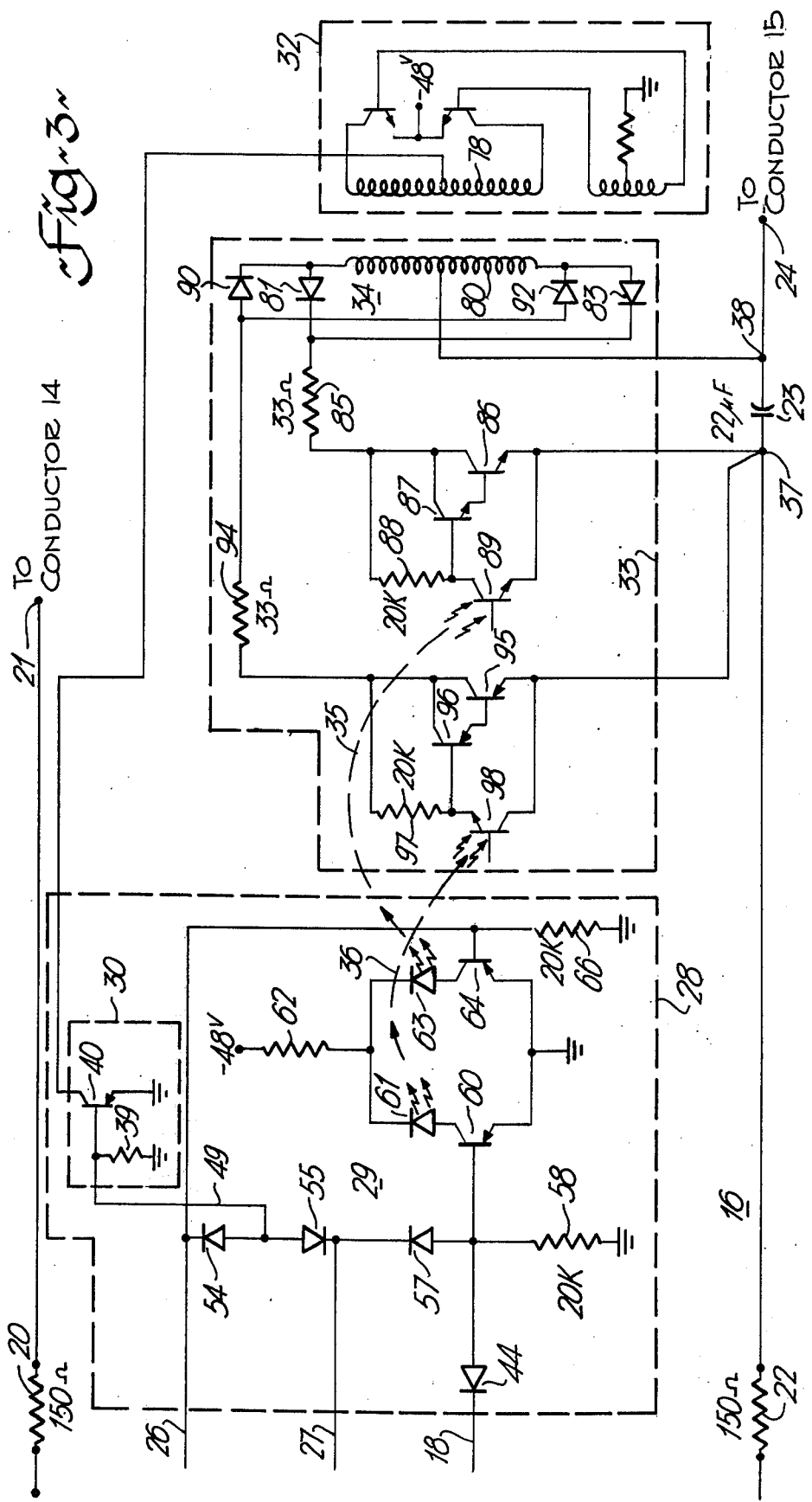

VOLTAGE BOOST CIRCUIT FOR TELEPHONE SYSTEMS

The present invention relates generally to voltage boost circuitry, suitable for telephone systems where reverse battery supervision is employed, and more particularly to a circuit for controlling the charge on the capacitor providing the voltage boost.

One of the requirements for satisfactory operation in a telephone system is the maintenance of an adequate DC current flow in each subscriber line. The line current is used for transmission, signalling and supervisory purposes and its magnitude should be maintained within specified limits for proper system operation. Each subscriber line resistance varies with the length of the line from the central office to the subscriber; this variance in resistance results in a variance of DC current flowing in each line.

The subscriber lines are energized by a battery located at a central office. For those subscriber lines which are too long to function properly with the DC current they receive from the battery at the central office, voltage boost circuits are inserted in the subscriber lines, in series-aiding relationship to the central office battery, in order to increase the operating current to an adequate magnitude.

Because reverse battery supervision (i.e. reversal in the polarity with which the central office battery is applied to the subscriber line) is often used for control purposes, it is desirable for the voltage boost circuit (or loop extender) to co-ordinate the polarity of the boost voltage with the polarity of the central office battery so as to maintain a series-aiding relationship that is as continuous as possible, between the central office battery and the voltage boost circuit.

During ringing, however, it is not desirable for the polarity of the boost voltage to reverse in accordance with the instantaneous reversals in the polarity of the composite voltage supplied by the central office. Instead, it is desirable for the boost voltage to be maintained in series-aiding relationship with the DC or trip component of the composite voltage. This ensures that the DC line current will be sufficient to energize the ring-trip relay upon answer by the subscriber.

During dialling, the line current is interrupted by the opening and closing of dial contacts in the subscriber's telephone set resulting in current pulses (i.e. dial pulses). For proper detection of dial pulses in the central office it is desirable for the voltage boost to be removed during the open period of each dial pulse and reinserted during the closed period of each dial pulse.

Many types of loop extenders or voltage boosters exist in the prior art; Canadian Pat. No. 856,904 dated Nov. 24, 1970 by I. M. McNair, Jr. describes one prior art voltage booster. In voltage boosters of the type depicted in Canadian Pat. No. 856,904 a capacitor is located in series with the subscriber line and is charged by a charging circuit so as to aid the central office battery. Prior art circuits of this type have the disadvantage that the capacitor providing the voltage boost maintains its charge during time periods when it would be preferable to have the capacitor discharged. For example, during dialling, it would be preferable for the voltage boost to be disconnected when the dial contacts are open and reinserted when the dial contacts are closed. Certain prior art voltage boosters employing capacitors in series with the subscriber line do not respond quickly enough to do this; consequently, the voltage boost remains continuously applied during dialling.

It is also advantageous to have the capacitor providing the voltage boost discharge rapidly once the voltage boost is no longer required. Such a feature allows the capacitor to be more quickly charged with the opposite polarity in order to follow rapid charges of polarity at the central office.

The present invention overcomes the deficiencies of the prior art by providing a charge control circuit which, aside from controlling the polarity with which the capacitor is charged, allows the capacitor to discharge very rapidly when an open circuit appears in the subscriber line or when the central office changes the polarity applied to the subscriber line. Thus, by quickly discharging the capacitor, the response time of the voltage booster is greatly enhanced.

The voltage boost circuit of the present invention can be located anywhere in the subscriber line between the central office and the subscriber telephone set. It can also be employed with PBX's (private branch exchange) and PABX's (private automatic branch exchanges) utilizing switchboards equipped with various cord circuits. In the preferred embodiment, the present invention employs optically coupled semiconductor devices for propagation of the logic signals to ensure a high degree of isolation between the capacitor charging circuit (i.e. charge control circuit) and the rest of the circuitry. It should be noted that, in the context of this disclosure, the term "subscriber line" is used to refer to a pair of electrical conductors connecting a subscriber telephone set to a central office.

The present invention employs a non-polar capacitor connected in series with one conductor of the subscriber line. This capacitor is charged to a predetermined voltage by a DC-DC converter and the polarity is such so as to aid, or increase, the voltage being supplied by the central office battery. A loop current detector senses current flow in the subscriber line as well as the polarity of the central office battery. The loop current detector provides logic signals which ultimately control the polarity of the voltage applied to the capacitor when the subscriber loop is closed. A ringing detector provides a priority logic signal to ensure that the polarity on the capacitor does not reverse during the ringing interval. The capacitor is discharged virtually immediately, once there is an open circuit in the subscriber line, via the normal circuitry of the circuit that applies the DC voltage to the capacitor (i.e. via the charge control circuit).

In other terms, the present invention provides a voltage boost circuit for use with telephone systems, the boost circuit comprising: a first pair of terminals for connection to a central office; a second pair of terminals for connection to a subscriber line; a detector means for sensing current flow in the subscriber line and for producing two logic output signals indicative of the current conditions in the subscriber line; a capacitor for connection in a series circuit relationship with one conductor of the subscriber line; an oscillator means for providing an alternating voltage; a charge control means for rectifying the alternating voltage and for applying the rectified voltage across the capacitor, in the appropriate polarity sense as determined by the logic output signals; and circuitry for discharging the capacitor in response to an open circuit in said subscriber line.

The invention will now be described in more detail with reference to the accompanying drawings, wherein like parts in each of the several figures are identified by the same reference character, and wherein:

FIG. 1 is a simplified block diagram of a typical telephone circuit incorporating the present invention;

FIG. 2 is a simplified block diagram of the circuit of the present invention; and FIG. 3 is a simplified schematic diagram of a portion of the circuit shown in FIG. 2.

Referring now to FIG. 1, there is depicted a central office 10 for energizing a subscriber telephone set 11 through conductors 12, 13, 14 and 15. A voltage boost circuit or loop extender 16 is located intermediate the central office 10 and the telephone set 11, as shown in the figure. As stated previously, the purpose of loop extender 16 is to increase the current in the line (i.e. in conductors 12, 13, 14 and 15) in order that telephone set 11 can be located a further distance from central office 10 then would otherwise be possible if the current were not increased. In standard telephone practice conductor 12 of central office 10, also labelled "TIP", is connected to ground potential; conductor 13, also labelled "RING", is connected to a DC level of −48 volts. Such a condition is referred to in telephony as "normal battery" and when the polarity is reversed (i.e. the TIP conductor is at −48 volts DC and the RING conductor is at ground potential) it is referred to as "reverse battery". This convention of referring to normal and reverse battery will be employed in this disclosure. It should also be noted that a "loop" as referred to herein, refers to the series arrangement of conductor 12, conductor 14, subscriber telephone set 11, conductor 15, and conductor 13. Consequently, a loop extender 16 functions so as to permit a longer loop. Loop extender 16 of the present invention can be located anywhere in the loop. As voltage boosters or loop extenders are well known in the field of telephony, the circuit of FIG. 1 will not be described in further detail.

FIG. 2 is a simplified block diagram of a loop extender 16 made according to the present invention. A ringing detector 17 is connected across the TIP and RING conductors as shown in the figure. Ringing detector 17 provides a control signal (on line 18) to control circuit 28 to enable it to distinguish periods of time when the ringing signal is applied across the TIP and RING conductors. The significance of this will be discussed later. Also connected to the TIP and RING conductors are sensing resistors 20 and 22 and a loop current detector 25.

When telephone set 11 (FIG. 1) goes off-hook current flows in the loop and a voltage drop occurs across resistors 20 and 22. Loop current detector 25 senses the voltage across resistors 20 and 22. If detector 25 senses zero voltage across resistors 20 and 22, then telephone set 11 is on-hook (i.e. not in use), there is an open circuit in the loop and consequently, essentially no current is flowing in the loop. If telephone set 11 is off-hook then substantial current (i.e. in excess of 5 ma) is flowing through resistors 20 and 22, and loop current detector 25 senses the magnitude and the polarity of the voltage drop across resistors 20 and 22 and produces logic signals on its two output lines 26 and 27. The signals on lines 26 and 27 are applied to control circuits 28. Control circuit 28 is comprised of two sub-circuits, namely polarity logic 29 and enabler circuit 30. The output of polarity logic 29 is applied to enabler circuit 30 and enabler circuit 30 functions as a power "on-off" switch for square wave oscillator 32.

The output from oscillator 32 is applied to charge control circuit 33 via a transformer 34 (see FIG. 3). Charge control circuit 33 functions to rectify the square wave signal from oscillator 32 and to apply the resultant rectified voltage across capacitor 23. The polarity which capacitor 23 is given by charge control circuit 33 is determined by polarity logic 29. Logic 29 exercises its control over charge control circuit 33 via light paths 35 and 36 which will be discussed later in greater detail. As is standard practice in telephony, capacitor 23 is charged in such a fashion that the polarity of capacitor 23 aids (or increases) the voltage of the battery (not shown) at central office 10 (FIG. 1). Capacitor 23 has two terminals, labelled 37 and 38. With normal battery polarity at the central office, and telephone set 11 (FIG. 1) off-hook, terminal 37 of capacitor 23 will be positive (+) with respect to terminal 38 due to the voltage applied to it by charge control circuit 33, thus aiding or increasing the voltage from the central office. When the central office employs reverse battery polarity, capacitor 23 is charged with the opposite polarity; i.e. terminal 37 will be negative (−) with respect to terminal 38.

FIG. 3, showing portions of loop extender 16 in somewhat more detail, will now be discussed. In the idle or "on-hook" condition there is essentially no DC current flowing in the loop (i.e. through either of the RING or TIP conductors). In this idle condition the logic signals on both lines 26 and 27 from loop current detector 25 (FIG. 2) are logic 0's (approximately zero volts DC). When telephone set 11 (FIG. 1) is busy (i.e. off-hook) and there is normal polarity applied by the central office (i.e. the TIP conductor is at ground potential and the RING conductor is at −48 volts DC) line 26 carries a logic 0 and line 27 carries a logic 1 (approximately −15 volts DC). When telephone set 11 (FIG. 1) is busy and there is reverse battery polarity applied by the central office (i.e. the TIP conductor is at −48 volts DC and the RING conductor is at ground potential) line 26 carries a logic 1 and line 27 carries a logic 0. As loop current detectors are well known in the art, detector 25 will not be discussed in greater detail.

The next portion to be described is control circuit 28. Control circuit 28 is comprised of two subassemblies, namely polarity logic 29 and enabler circuit 30. Diodes 54 and 55 form an OR gate with the input signals to the gate on lines 26 and 27, and the output of the OR gate being on line 49. Similarly, diodes 44 and 57 form an OR gate with the input signals to the gate on lines 18 and 27 and the output signal of the gate is applied to the base of transistor 60; resistor 58 serves a biasing function. Transistors 60 and 64 are used as power "on-off" switches for LED's 61 and 63 respectively. Resistor 62 is used for current limiting purposes, and resistor 66 is used for biasing.

The resultant logic signal from the OR gate formed by diodes 54 and 55 is applied to enabler circuit 30 via line 49. Enabler circuit 30 comprises a resistor 39 and a transistor 40. Transistor 40 functions as a solid state, power "on-off" switch for oscillator 32.

The operation of control circuit 28 will now be discussed briefly. When telephone set 11 (FIG. 1) is on-hook, lines 26 and 27 are both at a logic 0 level (i.e. approximately zero volts DC). Consequently, transistors 60 and 64 are off (i.e. non-conducting), and LED's 61 and 63 are likewise off and therefore not producing any light emissions. Also, transistor 40 of enabler circuit 30 is off. As a result, oscillator 32 does not oscillate and no voltage is applied to capacitor 23 by charge control circuit 33.

When telephone set 11 (FIG. 1) goes off-hook and normal battery polarity is provided by the central office, DC current flows through the loop. Loop current detector 25 (FIG. 2) senses this current flow and produces a logic 0 on output line 26 and produces a logic 1 on output line 27. As a consequence, output line 49 is at logic 1, and transistor 40 of enabler circuit 30 is on and oscillator 32 is activated. Additionally, transistor 60 is biased on and current therefore flows through transistor 60 and also through LED 61, producing an emission of light from LED 61. Transistor 64 and LED 63 remain biased off, with the result that LED 63 does not emit any light. As will be seen later, this results in controlling charge control circuit 33 in such a fashion that capacitor 23 aids the normal polarity of the battery at the central office.

When the central office supplies the loop with reverse battery polarity, the direction of current through the loop is of course opposite to what it was with normal battery polarity. The output signal on line 26 becomes a logic 1 and the output signal on line 27 becomes a logic 0. As a result, transistor 40 of enabler circuit 30 is on and consequently oscillator 32 is activated. At the same time transistor 64 is biased on and current flows through transistor 64 and LED 63 with the result that light is emitted from LED 63. Transistor 60 is biased off and consequently no current flows through LED 61 and no light is emitted from LED 61. As will be seen later, this results in controlling charge control circuit 33 in such a fashion that capacitor 23 aids the reverse battery polarity of the battery at the central office.

When telephone set 11 (FIG. 1) goes back on-hook the loop current ceases to flow, the voltage across resistors 20 and 22 will be essentially zero and lines 26 and 27 will go to logic 0. Consequently, transistor 40 of enabler circuit 30 becomes non-conducting. At the same time capacitor 23 discharges to remove the voltage boost from the line.

The purpose of ringing detector 17 will now be described. The central office signals telephone set 11 (FIG. 1) by the application of a ringing potential (typically 86 volts AC, 20 Hz) to the RING conductor and ground to the TIP conductor (superimposed on the already present −48 volts DC). In order to trip or stop the ringing when telephone set 11 (FIG. 1) is lifted off-hook during the ringing interval, the loop extender 16 should not reverse its boost polarity, but rather, maintain normal battery boost polarity. When the ringing potential is applied, ringing detector 17 (well known in the art) produces a logic 1 on line 18. This keeps transistor 60 conducting and LED 61 emitting light so that a polarity reversal of the voltage boost does not happen during the ringing interval (i.e. ringing detector 17 provides a priority logic signal). This is required so that the AC components of the composite voltage is not boosted (i.e. 86 volts AC, 20 Hz). This condition permits only boost of the DC component (i.e. negative cycles of the composite signal comprised of the standard −48 volts DC and the 86 volts AC) as required for proper ringing trip when telephone set 11 (FIG. 1) is lifted off-hook.

Turning now to oscillator 32, it should be noted that oscillator 32 can be any suitable oscillator, (driven or saturating core type), consequently it is not described in any detail. Oscillator 32 produces a square-wave output with a frequency of approximately 20 KHz. The output of oscillator 32 is applied to primary winding 78 of transformer 34 as shown in FIG. 3. Secondary winding 80 of transformer 34 is depicted as a part of charge control circuit 33. Essentially, charge control circuit 33 is a rectifier circuit which rectifies the voltage signal appearing on secondary winding 80 and charges capacitor 23 selectively, with one of three possible conditions; i.e. either terminal 37 of capacitor 23 is charged positively with reference to terminal 38 or else terminal 37 of capacitor 23 is charged negatively with reference to terminal 37 or there is no potential difference between terminals 37 and 38.

Diodes 81 and 83 are connected to winding 80 so as to form a full-wave rectifier, as shown in the figure. Diode 81 has its anode connected to one end of winding 80, diode 83 has its anode connected to the other end of winding 80, and the cathodes of diodes 81 and 83 are connected as shown in the figure. The centre tap of secondary winding 80 is connected to terminal 38 of capacitor 23. The junction of the cathode of diode 81 and the cathode of diode 83 is connected, via resistor 85, to the collector of transistor 86. The emitter of transistor 86 is connected to terminal 37 of capacitor 23. A transistor 87 has its collector connected to the collector of transistor 86 and its (transistor 87's) emitter connected to the base of transistor 86. A resistor 88 connects the collector of transistor 87 to the base of transistor 87. The base of transistor 87 is also connected to the collector of photo-transistor 89. The emitter of photo-transistor 89 is connected to the emitter of transistor 86. Light striking the base of photo-transistor 89 provides forward bias for the transistor, and thereby turns it on, as is well known in the art. The light for controlling the operation of photo-transistor 89 is received from LED 63 of polarity control circuit 29 via light path 35.

As stated previously, with reverse battery polarity at the central office, transistor 64 and LED 63 are both conducting with the result that LED 63 emits light. This light is received by photo-transistor 89 with the result that is forward biased and therefore conducting. This results in shunting out any base current for transistors 86 and 87, with the consequence that transistors 86 and 87 do not conduct any current and consequently capacitor 23 is not charged by the diodes 81 and 83.

The other charging circuit for capacitor 23 is comprised of diodes 90 and 92 interconnected as shown in FIG. 3. Diode 90 has its cathode connected to the same end of winding 80 as does diode 81 its anode and diode 92 has its cathode connected to the other end of winding 80. The junction of the anode of diode 90 and the anode of diode 92 is connected, via resistor 94, to the collector of transistor 95. The emitter of transistor 86 is connected to terminal 37 of capacitor 23. A transistor 96 has its collector connected to the collector of transistor 95 and its emitter connected to the base of transistor 95. A resistor 97 connects the collector of transistor 96 to the base of transistor 96. The base of transistor 96 is also connected to the emitter of photo-transistor 98. The collector of photo-transistor 98 is connected to the emitter of transistor 95. Light striking the base of photo-transistor 98 provides forward bias for the transistor, and thereby turns it on, as is well known in the art. The light for controlling the operation of photo-transistor 98 is received from LED 61 of polarity control circuit 29 via light path 36.

As was stated previously, with reverse battery polarity at the central office, transistor 60 and LED 61 are non-conducting, with the result that no light is transmitted via light path 36, and consequently photo-transistor 98 is biased off and non-conducting. Therefore transistors 95 and 96 receive forward biasing current and both transistors 95 and 96 are therefore on and conducting current and diodes 90 and 92 form a part of the active circuit. As a result, capacitor 23 becomes charged, with a negative potential on terminal 37 with reference to terminal 38.

With normal battery polarity applied by the central office, the situation changes. Now transistor 60 and LED 61 conduct with the result that light is emitted from LED 61 along light path 36 to photo-transistor 98, thus causing photo-transistor 98 to conduct. This of course short-circuits any biasing current to transistors 95 and 96 and they are therefore reverse biased and non-conducting. LED 63, on the other hand is non-conducting and therefore not emitting any light. Consequently photo-transistor 89 is turned off, and transistors 86 and 87 receive biasing currents and are therefore conducting. As a result, diodes 81 and 83 form the active rectifying circuit, and capacitor 23 becomes charged with a positive potential on terminal 37 with reference to terminal 38, thus aiding the normal central office battery.

In summary then, with normal battery polarity at the central office, transistor 60 and LED 61 conduct, photo-transistor 98 conducts and consequently transistors 95 and 96 are turned off. Diodes 90 and 92 do not form part of the active circuit. At the same time, transistor 64 and LED 63 do not conduct, with the result that photo-transistor 89 is turned off and transistors 86 and 87 are turned on. Consequently capacitor 23 is charged with a positive polarity on terminal 37 with reference to terminal 38 via current from diodes 81 and 83.

With reverse battery polarity at the central office, transistor 64 and LED 63 conduct, photo-transistor 89 conducts, and consequently transistors 86 and 87 are turned off. Diodes 81 and 83 do not form part of the active circuit. At the same time, transistor 60 and LED 61 do not conduct, with the result that photo-transistor 98 is turned off and transistors 95 and 96 are turned on. Consequently, capacitor 23 is charged with a negative polarity on terminal 37 with reference to terminal 38 via current from diodes 90 and 92.

When telephone set 11 (FIG. 1) returns to the on-hook condition, voltage boost is no longer required and oscillator 32 turns off. At the same time, capacitor 23 is immediately discharged. If the loop extender 16 had been in the normal battery polarity mode (i.e. a positive voltage on terminal 37) the capacitor 23 would be discharged via the current path comprising: terminal 37, transistor 95, resistor 94, diodes 90 and 92, winding 80, and terminal 38. If the loop extender 16 had been in the reverse battery polarity mode (i.e. a negative voltage on terminal 37) capacitor 23 would be discharged via the current path comprising: terminal 38, winding 80, diodes 81 and 83, resistor 85, transistor 86, and terminal 37.

When an off-hook (i.e. busy) condition is originated by telephone set 11 (FIG. 1) and the central office supplies normal battery polarity, an initial loop current (typically greater than 5 milliamperes) will flow through the following components: TIP conductor, resistor 20, terminal 21, telephone set 11 (FIG. 1), terminal 24, terminal 38, winding 80, diodes 81 and 83, resistor 85, transistor 86, terminal 37, resistor 22, and the RING conductor. When the central office supplies reverse battery polarity, and the telephone set 11 (FIG. 1) originates an off-hook (i.e. busy) condition, an initial loop current (typically, greater then 5 ma) will flow through the following components: RING conductor, resistor 22, terminal 37, transistor 95, resistor 94, diodes 90 and 92, winding 80, terminal 38, terminal 24, telephone set 11 (FIG. 1), terminal 21, resistor 20, and TIP conductor. In each instance, the initial current is detected by loop current detector 25, and loop extender 16 is put into operation to boost the voltage of the central office battery, as previously discussed.

It should be noted that loop extender 16 of this invention has a sufficiently fast response time that it can apply the voltage boost when the dialling contacts are closed, and it can remove the voltage boost when the dialling contacts are opened. In other words, loop extender 16 provides voltage boost during the closed period of each dial pulse and it removes the voltage boost during the open period of each dial pulse. It should also be noted that capacitor 23 serves, in addition to providing voltage boost, to pass voice frequency (VF) signals.

The foregoing has been a description of the preferred embodiment of the present invention, as envisioned by the inventor. It is to be understood that the device depicted and described in this specification is for one specific application of the invention only, and variations can be made therefrom depending upon the particular application. Accordingly, the device described herein should not be considered as a limitation of the invention in any manner whatsoever, but rather, considered solely as an example for illustrative purposes.

What is claimed is:

1. A voltage boost circuit for use with telephone systems, said boost circuit comprising:
   a first pair of terminals for connection to a central office;
   a second pair of terminals for connection to a subscriber line;
   a detector means for sensing current flow in said subscriber line and for producing two logic output signals indicative of the current conditions in said subscriber line;
   a capacitor for connection in a series circuit relationship with one conductor of said subscriber line;
   an oscillator means for providing an alternating voltage;
   charge control means for rectifying said alternating voltage, for applying the rectified voltage across said capacitor, in the appropriate polarity sense as determined by said logic output signals, and
   for discharging said capacitor in response to an open circuit in said subscriber line.

2. The voltage boost circuit of claim 1 wherein said oscillator means is turned on and off in response to said logic output signals, and wherein said means for discharging said capacitor is an integral part of said charge control means.

3. The device of claim 2 further including a ringing detector means for connection across said subscriber line;
   said ringing detector means sensing ringing potential on said subscriber line and providing a priority logic signal so as to prevent polarity reversal on said capacitor when a ringing voltage is supplied on said subscriber line by said central office.

4. The device of claim 3 further including a polarity control means for interfacing said detector means and said charge control means;

said polarity control means responsive both to said two logic output signals and to said priority logic signal so as to produce two logic light signals indicative of the status of said subscriber line;

said charge control means including two light responsive devices for sensing said two logic light signals and said charge control means controlling the polarity of the voltage applied to said capacitor, in response to said two logic light signals.

5. The device of claim 4 wherein said logic light signals are produced by light emitting diodes and said light responsive devices in said charge control means are photo-transistors; each said light emitting diode is interfaced with one photo-transistor in a one-to-one relationship.

6. A voltage boost circuit for use with telephone systems, said boost circuit comprising:

a first pair of terminals for connection to a central office;

a second pair of terminals for connection to a subscriber line;

a detector means for sensing current flow in said subscriber line and for producing two logic output signals indicative of the current conditions in said subscriber line;

a capacitor for connection in a series circuit relationship with one conductor of said subscriber line;

an oscillator means for providing an alternating voltage wherein said oscillator means is turned on and off in response to said logic output signals;

a charge control means for rectifying said alternating voltage and for applying the rectified voltage across said capacitor, in the appropriate polarity sense as determined by said logic output signals and including circuitry for discharging said capacitor in response to an open circuit in said subscriber line wherein said circuitry for discharging said capacitor is an integral part of said charge control means.

* * * * *